US008527948B2

(12) United States Patent
Niggemann et al.

(10) Patent No.: US 8,527,948 B2
(45) Date of Patent: *Sep. 3, 2013

(54) PROCESS OF AUTOMATIC MATCHING OF SOFTWARE

(75) Inventors: Oliver Niggemann, Detmold (DE);
Joachim Stroop, Paderborn (DE);
Rainer Otterbach, Schlangen (DE);
Herbert Hanselmann, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 97 days.

This patent is subject to a terminal disclaimer.

(21) Appl. No.: 12/939,083

(22) Filed: Nov. 3, 2010

(65) Prior Publication Data
US 2011/0072415 A1 Mar. 24, 2011

Related U.S. Application Data

(63) Continuation of application No. 11/078,635, filed on Mar. 11, 2005, now Pat. No. 7,853,941.

(30) Foreign Application Priority Data

Mar. 11, 2004 (DE) .......................... 10 2004 012 315

(51) Int. Cl.
*G06F 9/44* (2006.01)
*G06F 9/445* (2006.01)
(52) U.S. Cl.
USPC ............ 717/121; 717/122; 717/126; 717/170
(58) Field of Classification Search
None
See application file for complete search history.

(56) References Cited

U.S. PATENT DOCUMENTS

| 5,920,718 | A | 7/1999 | Uczekaj et al. |
| 6,049,671 | A | 4/2000 | Slivka et al. |
| 6,167,567 | A | 12/2000 | Chiles et al. |
| 6,526,570 | B1 | 2/2003 | Click, Jr. et al. |
| 6,609,248 | B1 | 8/2003 | Srivastava et al. |
| 6,654,954 | B1 | 11/2003 | Hicks |
| 6,698,014 | B1 | 2/2004 | Rechter |
| 7,853,941 | B1 * | 12/2010 | Niggemann et al. .......... 717/169 |

FOREIGN PATENT DOCUMENTS

DE 202 11 265 U1 1/2003

OTHER PUBLICATIONS

Hanselmann, H.; Kiffmeier, U.; Koster, L,; Meyer, M.; Rukgauer, A.;; Production Quaiity Code Generation From Simulink Block Diagrams, Computer Aided Control System Desion, 1999.
The East-EEA project—a middleware based software architecture for networked electronic control units in vehicles; T. Thurner, J. Eisenmann, Dr. U. Freund, Dr. R. Geiger, M. Haneberg, U. Virnich Dr. S. Voget; VDI Reports No. 1789-2003.
Automotive Open System Architecture Development Partnership Information Pack; Jan. 21, 2003.
dSpace—TargetLink 2.0, Feb. 2003.
Embedded UML Studio Willert Software Tools, Gmbh, Feb. 2003.

* cited by examiner

*Primary Examiner* — Chuck Kendall
(74) *Attorney, Agent, or Firm* — Orrick Herrington & Sutcliffe, LLP

(57) ABSTRACT

The invention relates to a process for the automatic matching of a control software component to a control unit network in order to permit communication between control software components of the control unit network, whereby the control unit network-independent communication commands of a control software component in the program code are replaced by control unit network-dependent communication commands.

14 Claims, 9 Drawing Sheets

State of the Art

State of the Art

State of the Art

PROCESS OF AUTOMATIC MATCHING OF SOFTWARE

The present application is a continuation of U.S. patent application Ser. No. 11/078,635, entitled Process for Automatic Matching of Software, filed on Mar. 11, 2005, now U.S. Pat. No. 7,853,941 which claims the benefit of and priority to PCT Application No. DE102004012315.2 filed on Mar. 11, 2004, which are both incorporated herein in their entirety.

The invention relates to a process for the automatic matching of a control software component to a control unit network, in order to allow communication between control software components of the control unit network.

Present-day control systems consist of hardware components, forming a control unit network, and software. By the same token, such a control system is often impacted by heterogeneity and complexity, resulting in long development times and high cost.

The market demands flexible control systems, which are readily adaptable and require brief development time. Embedded systems, such as for example control units in motor vehicles, are also affected by this circumstance. Here, at this time, the software module and/or software components are also tailored to specific hardware and/or control unit networks. If the hardware changes, the software component must be laboriously matched, or even newly specified. Beyond that, a motor vehicle already contains a number of different control units, further increasing the complexity.

A known solution to this problem consists in that software components of control systems are newly employed in other systems. This idea of re-using available components is already known from other areas of engineering, as for example the reuse of chassis elements for different automotive models.

For the transfer of this idea onto the software technology, software architectures were developed which support the reuse of software. These include software architectures based on so-called middleware, allowing for the reuse of software by abstracting equipment-specific interfaces, wherein the term "interface" is understood to refer to both hardware as well as software interfaces.

The aim is that the matching of a software component to concrete hardware, that is, to a control unit network, no longer be performed within the software component itself, but outside, in a supplemental software substructure, the so-called middleware. In this known setup, the functional portion of a software component no longer disposes of a hardware-specific code, but of standardized interfaces to the middleware, in order to gain access to the control unit network. Thus, the middleware functions as a go-between, linking the reusable software component on the one hand and the additional software and hardware substructures of the control unit network on the other.

By way of its standardized "go-between" activity, the middleware uncouples the reusable software components from the control unit network and thereby abstracts the interfaces as for example to the operating system or to the communication substructures, such as TCP/IP, CAN or FlexRay. As a logical consequence, only the middleware need still to be matched to a control unit network. Conversely, the software components may be exchanged without matching expenditures.

In this known setup, therefore, the developers of software components need no longer be concerned about hardware-side, in other words control unit network-dependent, communication details. They view other software components as abstract service providers. Beyond that, the insertion of middleware may make it possible for software components to be also generated, deleted or even relocated in real time.

Middleware itself consists of software configured at today's state of the art within the development time of a control unit system. A further possibility consists in generating middleware tailor-made to specific requirements.

Depending on the intended application, along with the abstraction of a control unit network, middleware may offer further services, respectively additional possibilities of abstraction. Known in professional circles are further middleware-typical services, as for ex. Proxy support, Directory for Server Naming Service, Policies (rights, security etc.), Quality of Service, Transactions, Fail-proof Redundancies, Alarm messages, Speech-independence, Concurrency, Events, Licensing and Persistence.

In the field of technology, there are known middleware-based software architectures, such as Corba, Minimal Corba, RT Corba (OMG), COM/ActiveX/DCOM (Microsoft); NET (Microsoft); RMI, Java Beans, EJB (SUN and/or Java Community) as well as additional Software architectures from associations such as EAST (cf. VDI Report No. 1789, 2003) or AUTOSAR (cf. Information Pack of Jan. 21, 2004).

At the present-day state of the art, software components including interfaces, for example to the control unit network, and interlinks to other software components, are at this time specified.

Included are, for example, non-functional requirements as for ex. such time response as maximum latency time for a communication link between two software components and/or the methods thereof, or even required maximum method performance times.

The specifications may also include abstract performance definitions, for example by way of finite automatons which specify the pre- and post-conditions of the methods or with the aid of UML sequential diagrams. Already known here in the technology is Vector Informatik's Da Vinci development tool.

In this conjunction, the interface may be interpreted as a sealed contract between two software components. If a software component A makes use of the offered interface of software component B, the software component A may rely that the software component B will fulfill the interface definition, that is to say, the contract.

In specifying such software component interfaces, it is assumed that the middleware will implement communication, including defined non-functional interface components, between the interlinked software components, and this independent of subsequent implementation in the effective hardware architecture, that is to say, for, example the control unit system.

In a parallel process, the hardware architecture of the control unit network is defined, as for example the number and the type of processors and the bus system employed. Thereafter, the software components are allocated to the processors and the bus systems. It follows that the software component A need not know either during the development time or in running time the location of software component B within the control unit network.

During the running time, the middleware determines the location of software component B in light of the configuration plotted by it, and decides on its own whether it needs to transmit the message by means of inter-process communication, for example to the local control unit or, for example, by means of network communication to a remote control unit in the network and/or the control unit system, for example for the reason that the software component B is located on another control unit.

The functional portion of a software component is specified in a second step. This is accomplished, for example, either directly by means of the manual construction of the program code or by automatic code generation from abstract models, as for example from Simulink, from SDL or from UML. In specifying functionality, it is possible to fall back on the previously mentioned middleware services. Decisive is for the function developer to utilize only the middleware functions, to ensure subsequent reuse, independent of control unit hardware installed later on. With the termination of the function development, all portions of a program capable of running are at hand.

It is typical and necessary for this known setup that the software components together with the middleware, the operating system and hardware-side drivers, as for example communication network drivers, be compiled, interlinked and implemented on one or more control units.

The drawbacks for the utilization of middleware are the required extra communications structures, extra storage space, extra processor performance, extra software database or additional software tasks necessary for the implementation of middleware. Accordingly, compared to an individual solution tailored to the control unit network, middleware often calls for faster processors and greater memory, which in turn increases the cost of hardware for the control unit system.

The task of the present invention is to make use of the typical middleware advantages, such as abstract control unit network-independent interface functionalities, for example reusable software components, abstracting of control unit network, of the functional component interfaces, non-functional specifications and qualification of communication correlations, while at the same time avoiding the typical previously described drawbacks.

According to the invented process, this task is solved in that control unit network-independent communication commands programmed by a programmer in program code to a control software component are replaced by control unit network-dependent communication commands.

Hence, for the execution of the process according to the invention, a programmer can program in known fashion independent of the control unit network, for example also by utilizing previously employed middleware commands known to him. In the wake of such programming, or also even in the course of such programming, the control unit network-independent communication commands may be substituted by the process according to the invention. Such substitution may be computer-implemented, for example by software running for example in the background during programming or modifying the source code even after the construction of a software component. Preferred are both the originally programmed control unit network-independent communication command as well as, after substitution, the control unit network-dependent communication command in the same source code, that is, in the same programming language.

In this context, the software for the execution of the invented process may be deemed a kind of code-generator/modifier having access to configuration information wherein the concrete hardware architecture, if need be the software architecture and eventually other mandatory specifications of the control unit network are deposited. In the execution of the process, it is from this configuration information that can be deduced how a control unit network-independent communication command is to be replaced against one that is control unit network-dependent.

In the course of the transformation of software and/or of a software model into a source code, a code generator may generate several intermediate representations of the software. Transformation may therefore take place in one or more steps.

To good advantage, provision may be made for a code-generator/modifier working according to the invented process to execute at any given point in time during the transformation of the model into the source code the substitution of control unit network-independent communication commands, for example during a transformation stage or even divided over several transformation stages. The code generator/modifier my also execute the replacements in the wake of the transformation stages, in one or more intermediate representations between model and source code.

One concrete example of an intermediate representation would be a data-technical description of the model in the memory of the code generator/modifier or for example an intermediate representation of the code generator/modifier as a file, already containing concrete source code commands, but in the XML format.

An essential advantage of this process lies in the fact that preferably even during the development time of a control unit network-independent software component, the matching and thus the generation of a control unit network-dependent software component takes place, thus making the known middleware completely or at least partly superfluous in the running time, thereby saving resources and, by the same token, costs both on the side of hardware as well as on the side of software in the control unit system.

All advantages afforded by the middleware in this state of the art are also realized by the process according to the invention. Thus, it is possible to program even reusable applications to be employed via the computer and/or the control unit network.

To this end, at the time of developing and modelling a software component, there are also afforded middleware-typical abstract interface functionalities, such as for example reusable software components, abstracting of hardware for example of the communication and operating system, functional component interfaces and qualification of communication relationships.

Nevertheless, as of the running time there is no need for any middleware-typical expenditures, such as supplemental communication strata, extra storage space, additional processor performance, extra software database or additional task software.

To fulfill this requirement according to the invention, the mapping of the abstract control unit network-independent software component or of a software module may be performed onto a software running time model by means of the code generator/modifier at any time prior to the run time, as for example at the compile time.

Accordingly, the heretofore middleware-typical functions are incorporated even prior to the running time by automated systematic concretization of the abstract and/or standardized functional routines into the control unit network-independent software components.

The architecture information as to the concrete system platform, that is, the control unit network, as was notoriously available in the middleware, is now merely employed in the modelling time, that is to say, during the definition of the software components.

In order to arrive at the process according to the invention, it took first of all technical considerations as to the physical elimination of the existing middleware from the overall control system. To accomplish this, there is need for a different procedural approach in configuring the software components, for example by making a database available at the time of development, which provides the required control unit network-dependent architecture information and/or specifications and thereby the interrelations between the control unit network-independent communication commands and the control unit network-dependent communication commands, whereby the process according to the invention may access such information.

For clarification, reference is made to the aforementioned application example of software component A and software component B, assuming that software component A wants to transmit a message to software component B and that software component B is linked to another control unit, for example via the network Dispensing with the middleware, it is necessary in this example to assign to a different site of the programming process the decisional function as to the location of a software component and the resultant communication command—local or network—to be called up.

I.

In the first example of execution, this takes place at the time of the source code construction. For example, if the software developer develops a functional code for the software component A and wishes to transmit a message to software component B, he issues an abstract command for the transmission of a message from software component A to software component B, regardless of the type and manner of physical transmission (local or network). In other words, the programmer programs independently of the control unit network and need not be concerned about the subsequent architecture of the run-time environment on the side of the hardware.

Next, the code generator/modifier may examine according to the invention the source code for control unit network-independent communication commands and based, for example, on the static situation (the software components stay in the same location throughout the running time) it may in this example determine the mode of transmission for the entire time and thereby in light of the predetermined specifications write directly into the software component the command for the transmission of a message, in this example by way of the network, that is to say, generally speaking, replace the detected control unit network-independent communication command for a control unit network-dependent one.

The function heretofore inherent in the middleware, to verify just how a control unit network-independent communication command must concretely be executed, in other words, for example, where a message is supposed to be transmitted, and search for and carry out the command corresponding thereto, now becomes superfluous. In this manner, the entire middleware becomes superfluous during the running time.

In exceptional instances it may happen that in frequently repetitive source codes, portions of the code may be deposited in a database. This, however, is not in conflict with the thought behind this invention, as this represents merely an optimization. At the level of the source code, the availability of the software component for reuse remains preserved, to the extent that the process according to the invention, thus for example the code generator/modifier, has not yet been activated.

II.

In a second example of execution, the developer may also program graphically, for example by developing the functions in the form of models, whereby according to the invention, for example with a code generator/modifier, a substituted control unit-dependent communication command may be generated from the graphic model of the source code. This control unit network-dependent program step may then be present for example as a text source code, whereby the exchangeability of the software component remains preserved at the graphic abstraction level.

III.

In a third example of execution, in order to carry out the invented process, the code generator/modifier may also be in position to generate from the graphic models both source code variants, that is to say, once with abstract middleware commands and once with substituted then control unit network-dependent communication commands. This is advantageous when a programmed application, that is, a software component, needs to be executed both by middleware-based systems as well as by systems without the middleware.

IV.

In a fourth example of execution, the substitution of the abstract control unit network-independent communication commands may also take place at the time of generation in an intermediate representation customary for the code generator/modifier (intermediate code) between model and source code, or in an intermediate representation at any given stage of transformation, whereby the substitution may also be divided over several stages of transformation or over several intermediate representations. Or the substitution may take place after translation in the machine code capable of running.

V.

In a fifth example of execution, the code generator/modifier for the execution of the invented process may be in a position to generate from graphic models or from a pre-existing source code a mixed solution with control unit network-independent communication commands or known middleware commands. Thus, the code generator/modifier may be in a position to replace in all static segments of an overall Control system the abstract control unit network-independent communication commands in the software components.

For the dynamic portion of an overall control system, for example where software components are generated, cancelled or even relocated in the running time, middleware may be required, since in such an instance, for example, the locations of software components may only become known during the running time.

For these segments, the code generator may generate the calls necessary for the abstract middleware functions of the software components as well the functions of middleware tailored to size for an independent software structure. Optionally, the code generator/modifier may generate a configuration database containing information on the utilized middleware function call-ups. Such a database may serve a third party software in the event that the generation of middleware does not take place by way of the code generator/modifier.

For the overall control system, the saving or at least the reduction of known middleware signifies a saving of running time (reduced processor load) and lesser use of storage as compared to a middleware solution according to the present state of the art, notwithstanding the utilization of abstract interfaces at the time of development.

The invented process may be embedded in a concrete application, for example in a test environment for Embedded Control Prototyping, whereby the developer may try out at a very early point in time his control unit programs created with the invented process on a test system already outfitted for example with the processor of the serial control unit.

The following figures illustrate the state of the art and the examples embodying the invention:

Figure 1A:
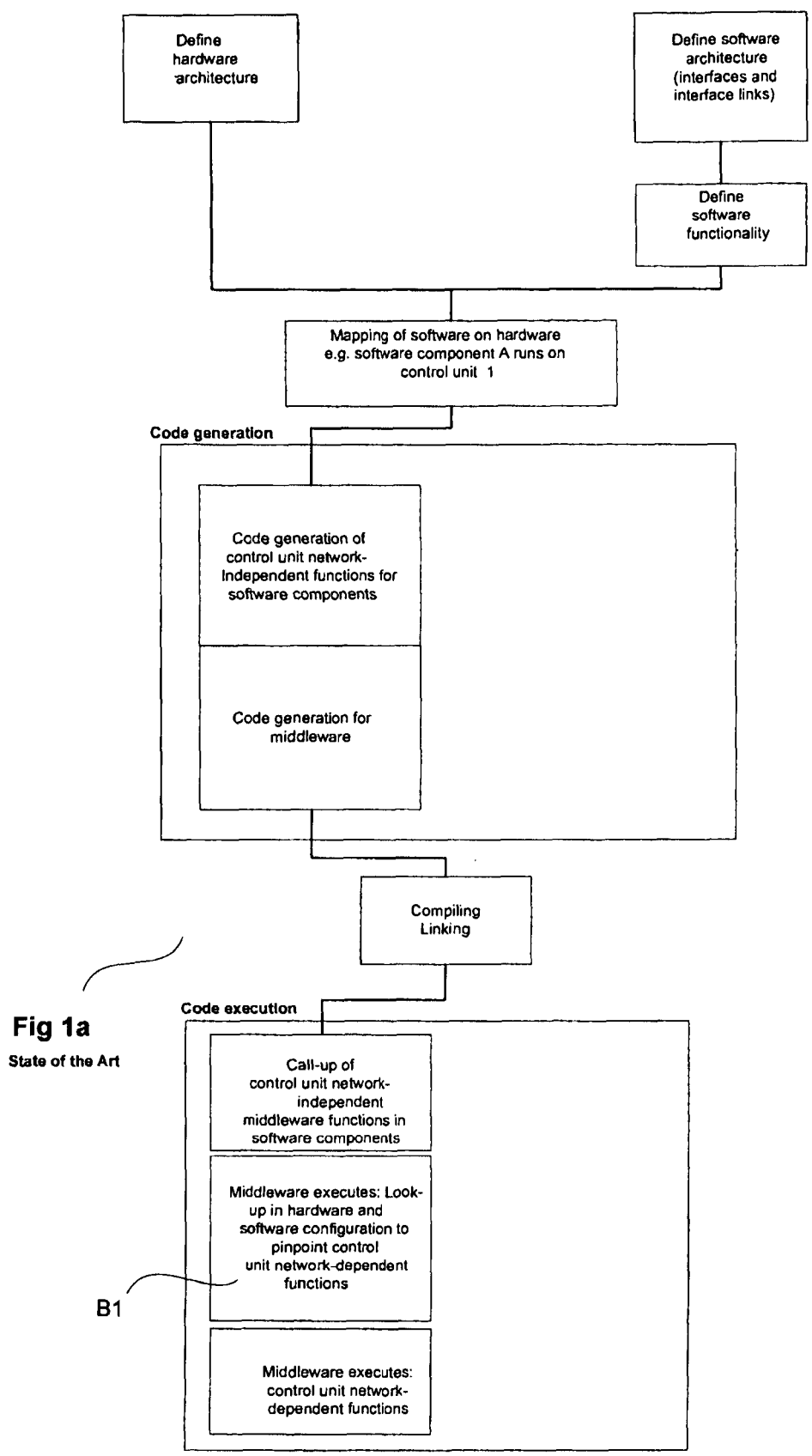
FIG. 1a illustrates the process according to present-day state of the art, commencing from the definition of architecture down to the execution of the codes.
Figure 1B:
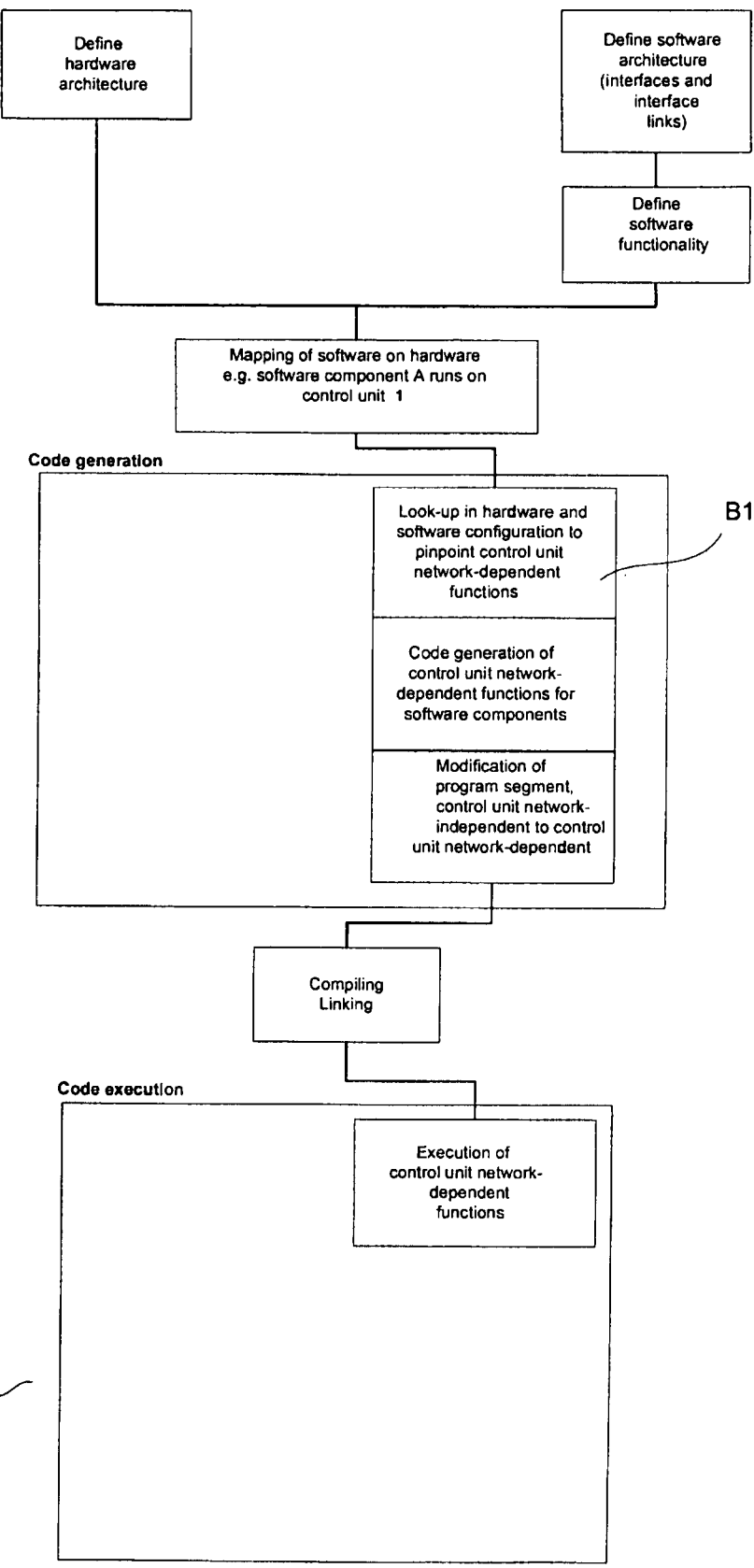
FIG. 1b illustrates the process consistent with the present invention.
Figure 1C:
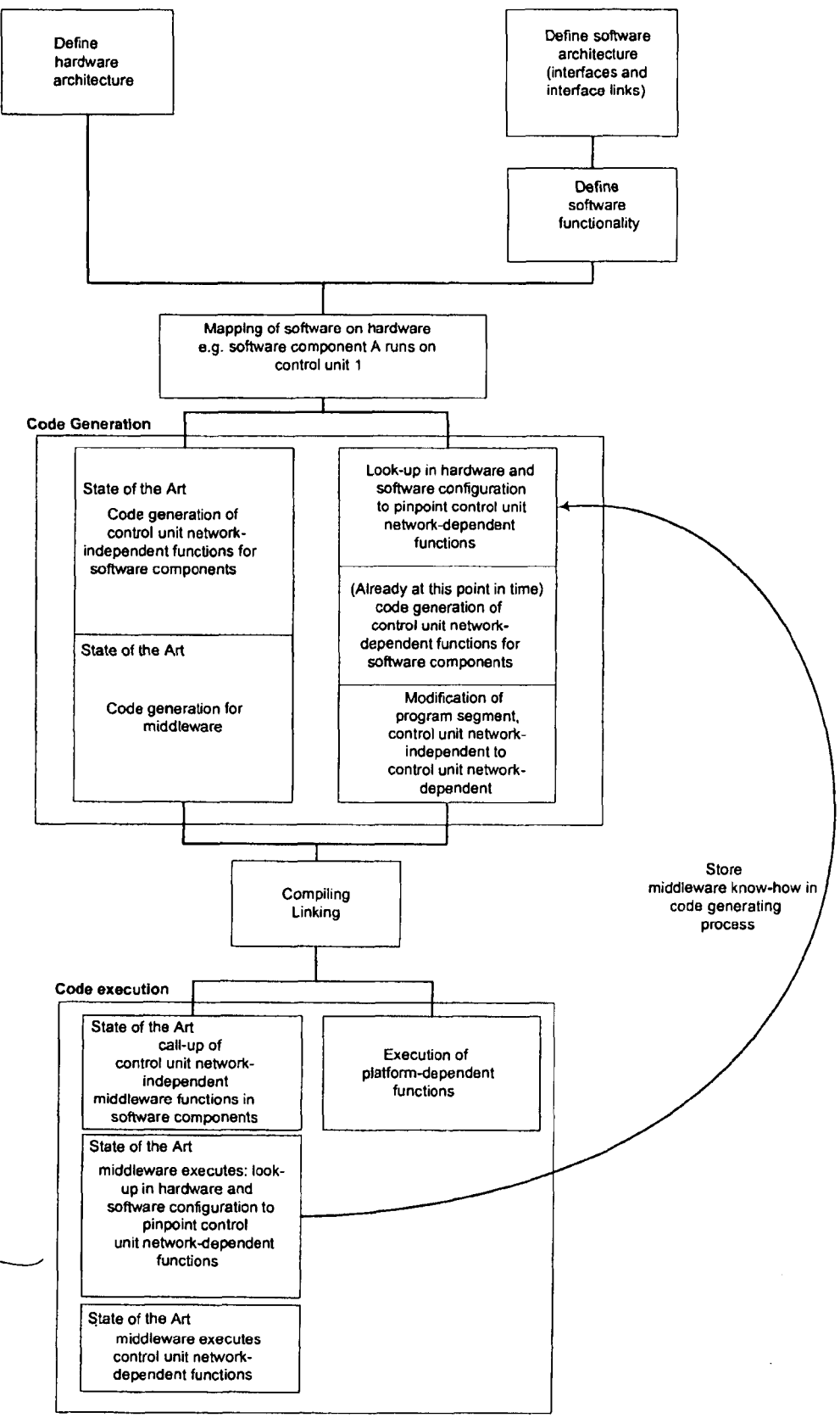

FIG. 1c compares the process according to the present state of the art with the process according to the present invention.

Figure 2:
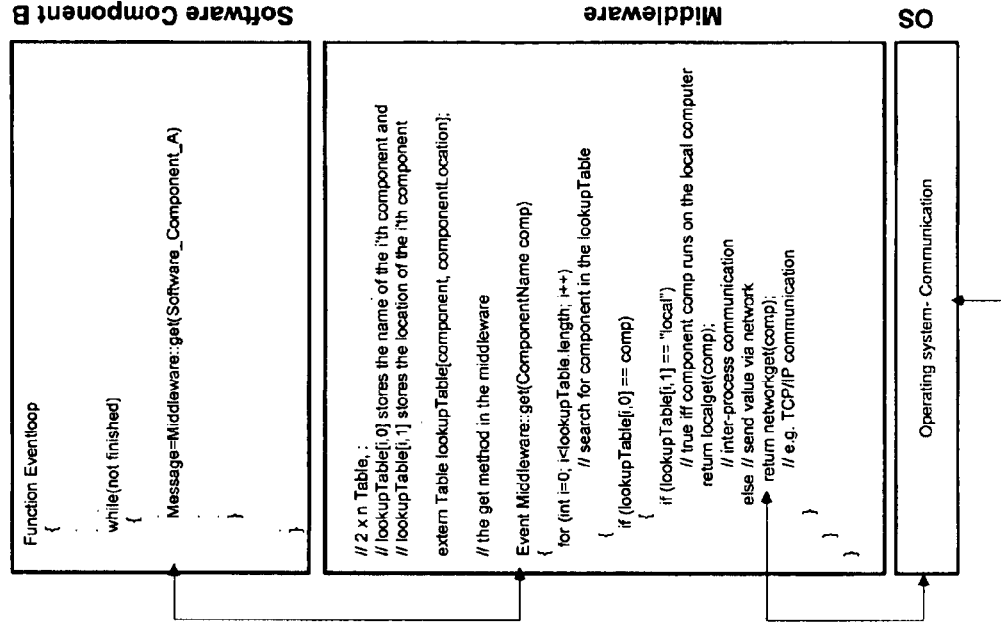
Figure 2:
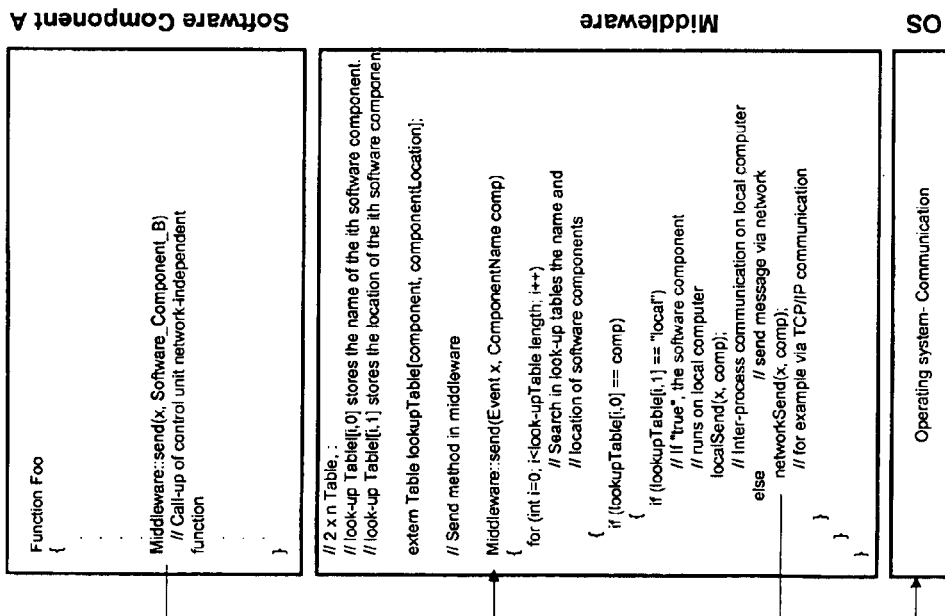

FIG. 2 shows a concrete exemplified code with pseudocode (semiformal, readily legible program code) according to the present-day state of the art with existing middleware in the running time (based on explanations in the descriptive portion)

Figure 2A:
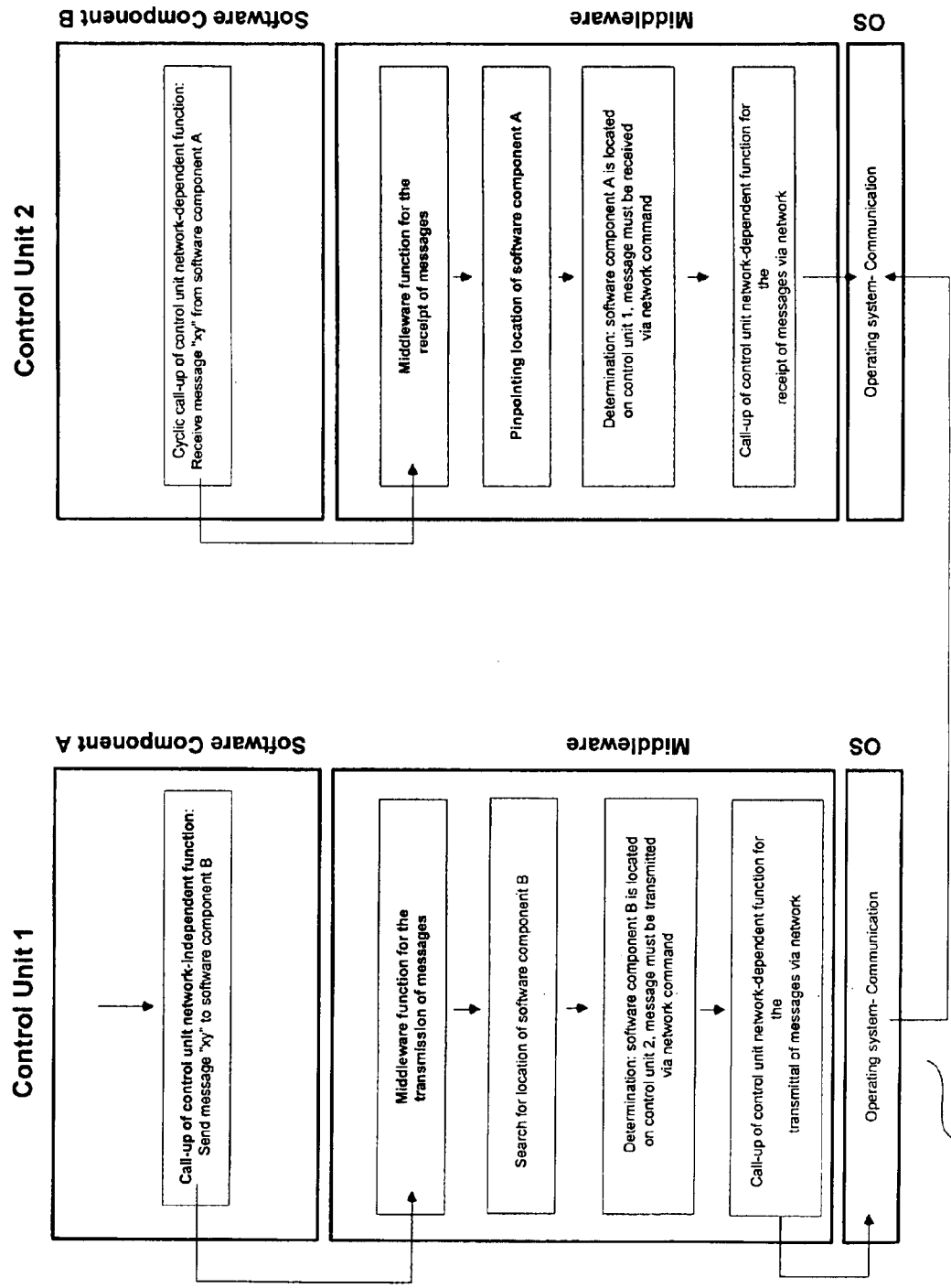

FIG. 2a shows a flow chart according to the present state of the art, being an abstraction, respectively an explanation of the exemplified code in FIG. 2.

Figure 3:
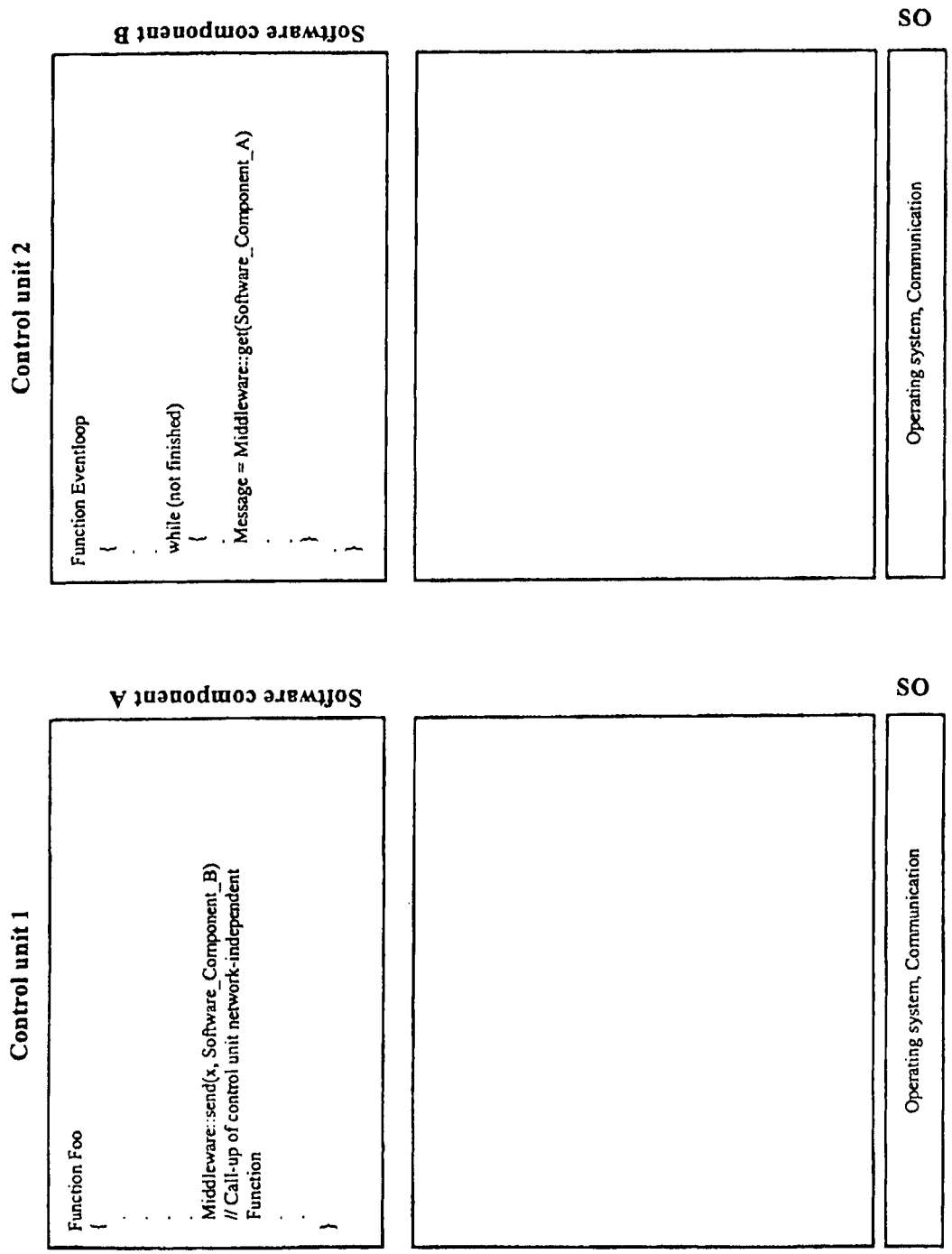

FIG. 3 shows a concrete exemplified code with pseudocode according to the present invention, at the time of development.

Figure 3A:
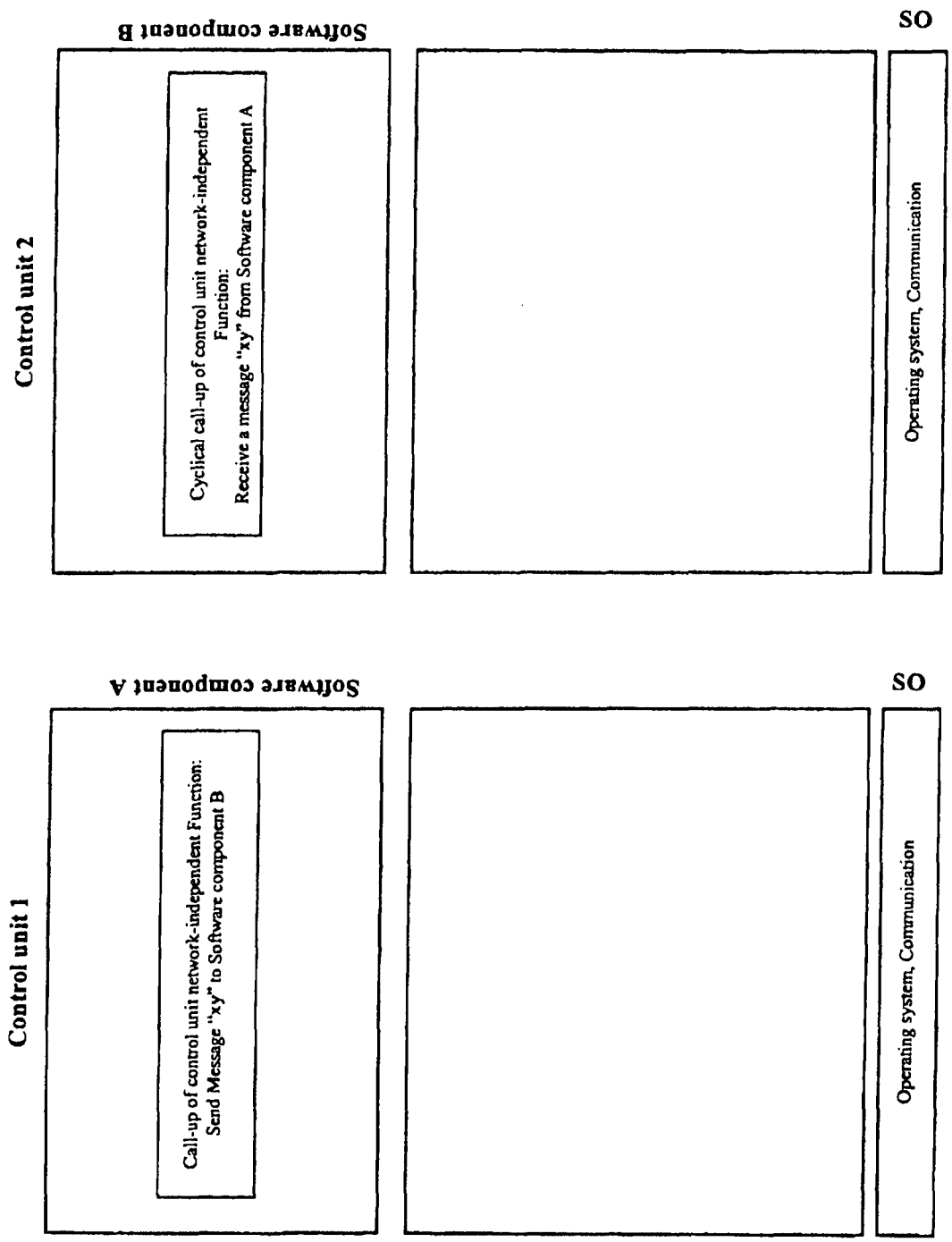

FIG. 3a shows an abstraction, respectively an explanation of the code exemplified in FIG. 3.

Figure 4:
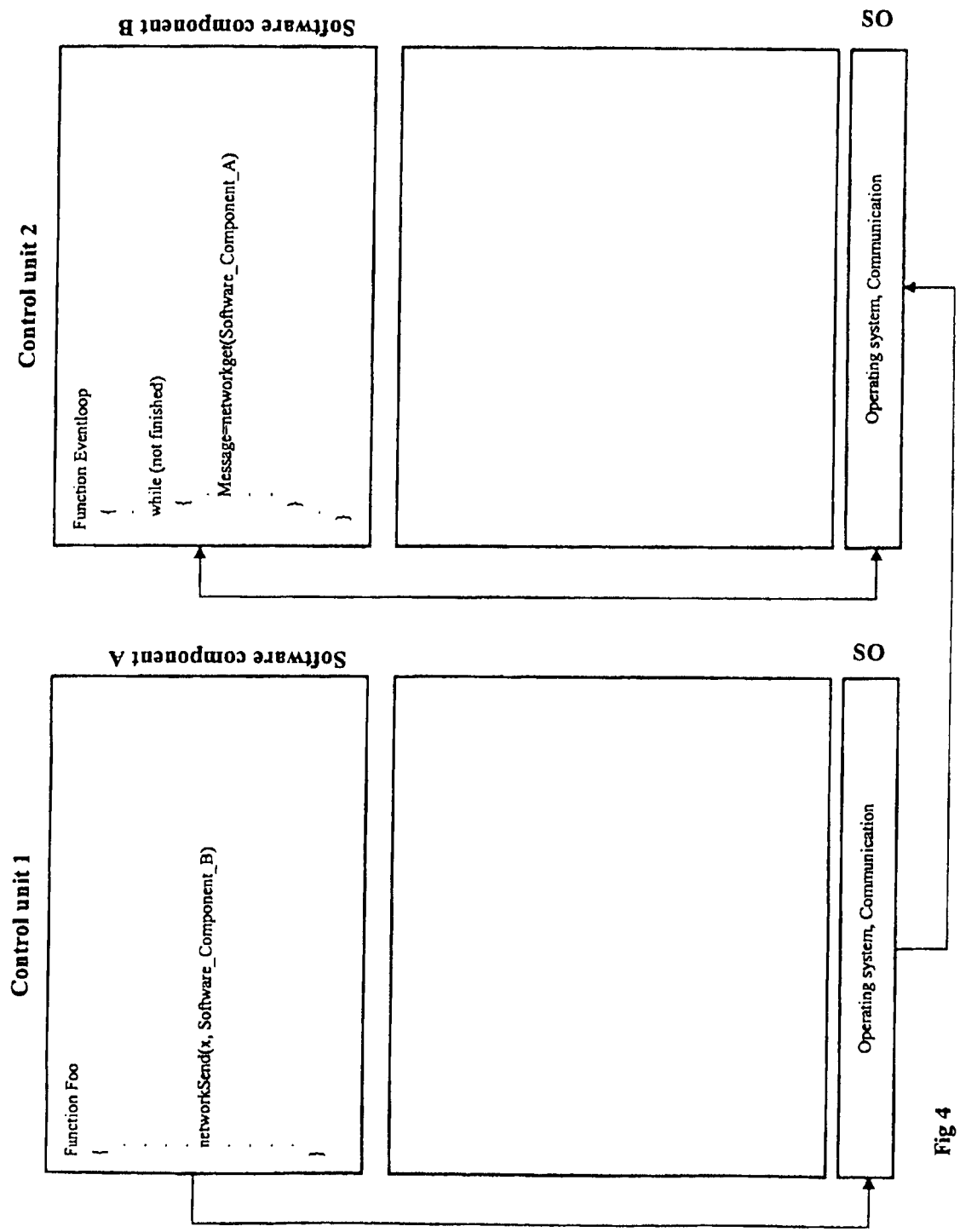

FIG. 4 shows a concrete exemplified code with pseudocode according to the present invention.

Figure 4A:
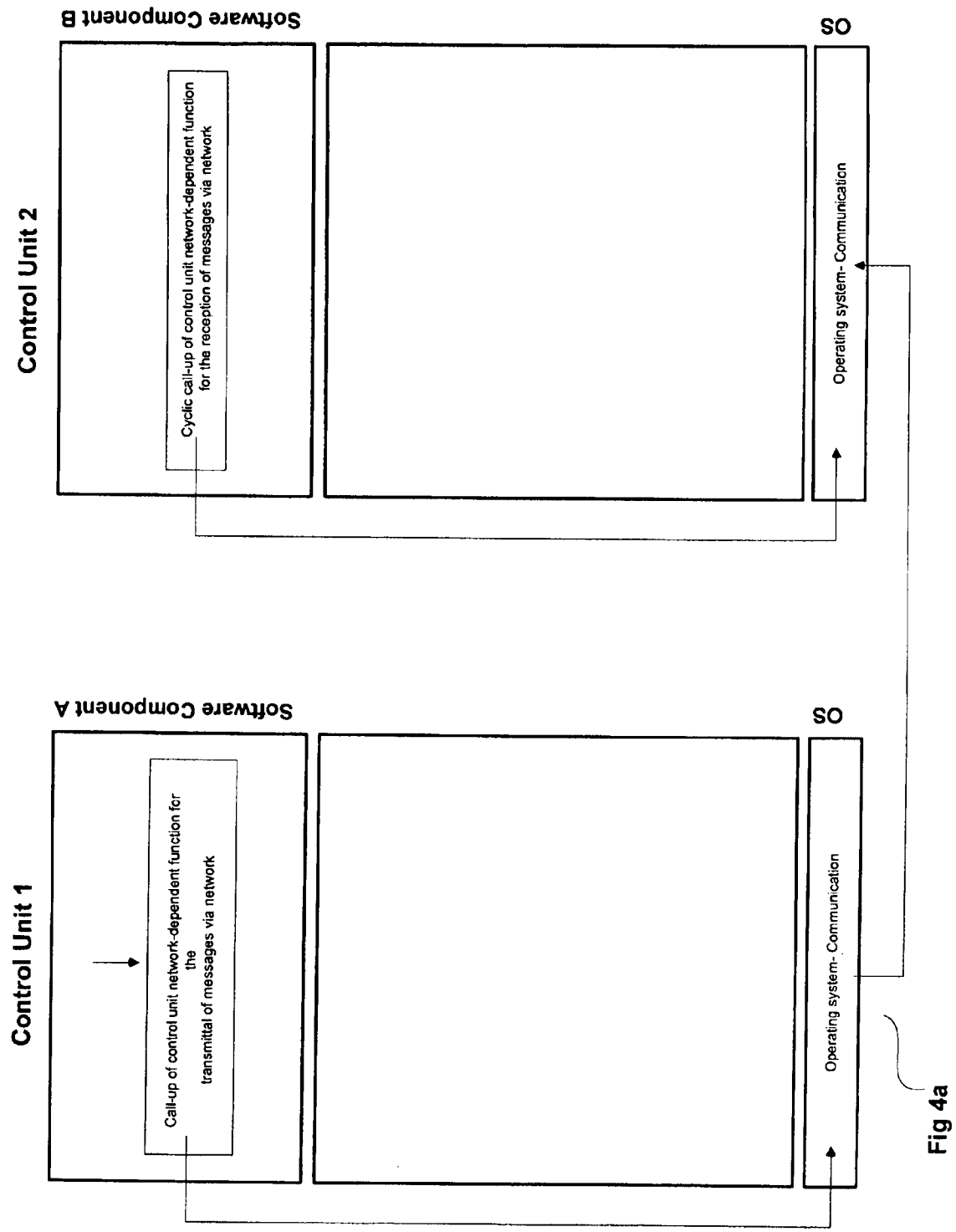

FIG. 4a shows a flow chart according to present-day state of the art, being an abstraction, respectively an explanation of the code exemplified in FIG. 4.

FIG. 1a described the path of programming according to the present-day state of the art. Commencing in the flow chart above, the hardware and software architectures are first defined along with the functionality of the software. These definitions are mutually interrelated and interlinked, so as to establish in this embodiment that a software component A is meant to run on control unit 1.

During the time of development, the source code is generated both for a software component as well as for the code of a previously described middleware. The source codes so generated (whether textual or graphic) are compiled and interlinked so that both the control unit network-independent software component capable of mechanical running and the middleware are available during the running time in the memory of a control unit system.

Next, in the running time the control unit network-independent middleware functions are called up in the software component, thereby effecting a branching into the middleware. Depending on the stored configuration, the latter searches during the running time for the corresponding control unit network-dependent program step and executes it.

FIG. 2a shows in general this functional mode exemplified by communication of two software components. During the running time a control unit network-independent function is elicited in software component A, intended to transmit a message "xy" to another software component B, whereby software component A runs on control unit 1. The corresponding middleware function is elicited as a sub-routine, since the software component A has no available architecture information. The location of software component B is determined in the middleware and it is established that the message is to be transmitted by way of a network communication to control unit 2, which is then executed by way of an operating system routine.

During the running time, the software component B cyclically searches for incoming messages. To this end, a middleware function is also called up, and it determines that the network needs to be utilized for the receipt of messages of software component A. Accordingly, the middleware checks with the operating system for any messages received over the network.

FIG. 2 shows a concrete program sequence applicable to this example. In the software component A, the control unit network-independent command "send" for the transmission of a message is qualified by the prefixed command "middleware", thereby branching it out into the corresponding middleware "send" routine, where the corresponding control unit network-dependent command "network send" is executed on the strength of the stored architecture. The identical process applies at the receiving end in the software component B.

FIG. 1b illustrates the process according to the invention. The definitions of hard- and software are executed in known fashion. In the generation of the source code, there is initially a control unit network-independent communication command which is modified by reverting to the soft- and hardware configuration imparted at development time, whereby the control unit network-independent commands are replaced with control unit network-dependent commands.

Accordingly, after the next following compilation of the fully converted source code, only the control unit network-dependent machine code still remains in the memory of the control unit system. This machine code is available for implementation without the need to revert to any middleware. Any information notoriously afforded by the middleware as to the running time is now solely required for development time.

In a comparison of both processes, FIG. 1c illustrates how Block B1 in FIG. 1a representing the know-how of the middleware, is stored in the code generating process of FIG. 1b. During the running time (Execute Code) this makes it possible to execute the control unit network-dependent functions without detours via the middleware.

FIG. 3a illustrates an abstract example of the invented process wherein the programmer initially programs a control unit network-independent function. FIG. 3 shows a pertinent concrete exemplified code according to the present invention as of the time of development. As a possible embodiment, the initial step here generates the control unit network-independent middleware command and only in the second step, while still within the development time, the control unit network-independent command is replaced with a control unit network-dependent command based on the available information as to the hardware and software architecture.

This may be done automatically by a program for example through an automatic code generator/modifier. The result is abstractly illustrated in FIG. 4a and concretely in FIG. 4. According to FIG. 4, the invented process has already replaced during the development time the control unit network-independent "middleware:send" command with the concrete "networkSend" command, based on the architecture known at the time of development.

Inasmuch as according to the invention the system architecture is taken into account already during the time of development, it is manifest that no middleware exists any longer during the running time according to this invention and that the control unit network-dependent functions are directly elicited in the software components.

SUMMARY

The invention relates to a process for the automatic matching of a control software component to a control unit network in order to permit communication between control software components of the control unit network, whereby the control unit network-independent communication commands of a control software component in the program code are replaced by control unit network-dependent communication commands.

The invention claimed is:

1. A system, comprising:
    a control unit network; and
    a computer having executable software for matching a control software component to the control unit network, the software:
    generating code for the control software component, wherein the code contains one or more first communication commands that are independent of the control unit network;
    identifying the one or more first communication commands;
    matching each of the one or more first communication commands with one or more second communication commands, wherein the second communication commands depend on the control unit network's hardware and correspond to functions performed by the one or more first communication commands, wherein the matching uses hardware architecture information of the control network stored in a database; and
    replacing each of the one or more first communication commands in the control software component with the corresponding second communication command matched to it.

2. The system of claim 1 wherein the matching is performed by a computer implemented software process.

3. The system of claim 1, wherein the first communication commands are text source code and the second communication commands are text source code.

4. The system of claim 1, wherein the first communication commands are graphic source code and the second communication commands are graphic source code.

5. The system of claim 1, wherein the first communication commands are graphic source code and the second communication commands are text source code.

6. The system of claim 1, wherein the first communication commands are machine code and the second communication commands are machine code.

7. The system of claim 1, wherein the replacement takes place in an intermediate representation of the control software component.

8. A computer-readable medium having instructions stored thereon, the instructions, when executed by a processor, causing the processor to:
    generate code for a control software component, wherein the code contains one or more first communication commands that are independent of a control unit network;
    identify the one or more first communication commands;
    match each of the one or more first communication commands with one or more second communication commands, wherein the second communication commands depend on the control unit network's hardware and correspond to functions performed by the one or more first communication commands, wherein the matching uses hardware architecture information of the control network stored in a database; and
    replace each of the one or more first communication commands in the control software component with the corresponding second communication command matched to it.

9. The computer-readable medium of claim 8, wherein the matching is performed by a computer implemented software process.

10. The computer-readable medium of claim 8, wherein the first communication commands are text source code and the second communication commands are text source code.

11. The computer-readable medium of claim 8, wherein the first communication commands are graphic source code and the second communication commands are graphic source code.

12. The computer-readable medium of claim 8, wherein the first communication commands are graphic source code and the second communication commands are text source code.

13. The computer-readable medium of claim 8, wherein the first communication commands are machine code and the second communication commands are machine code.

14. The computer-readable medium of claim 8, wherein the replacement takes place in an intermediate representation of the control software component.

* * * * *